No. 698,973. Patented Apr. 29, 1902.
M. LARAMIE.
ANIMAL TRAP.
(Application filed Dec. 28, 1901.)
(No Model.)
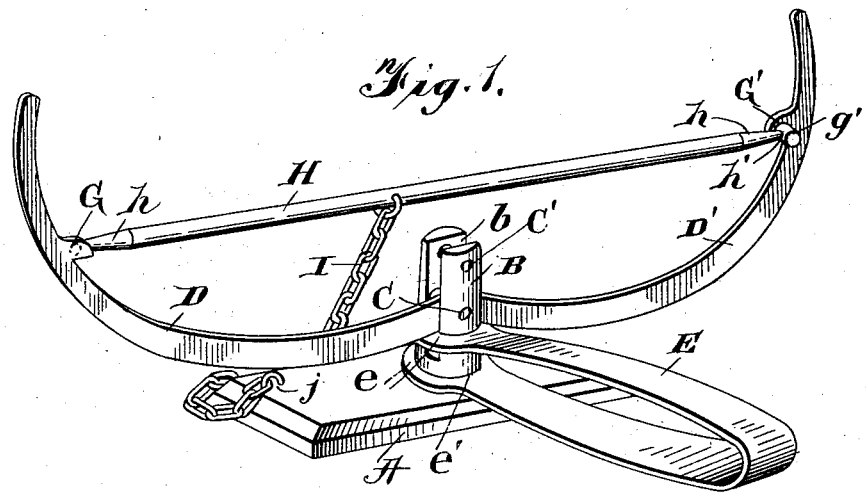
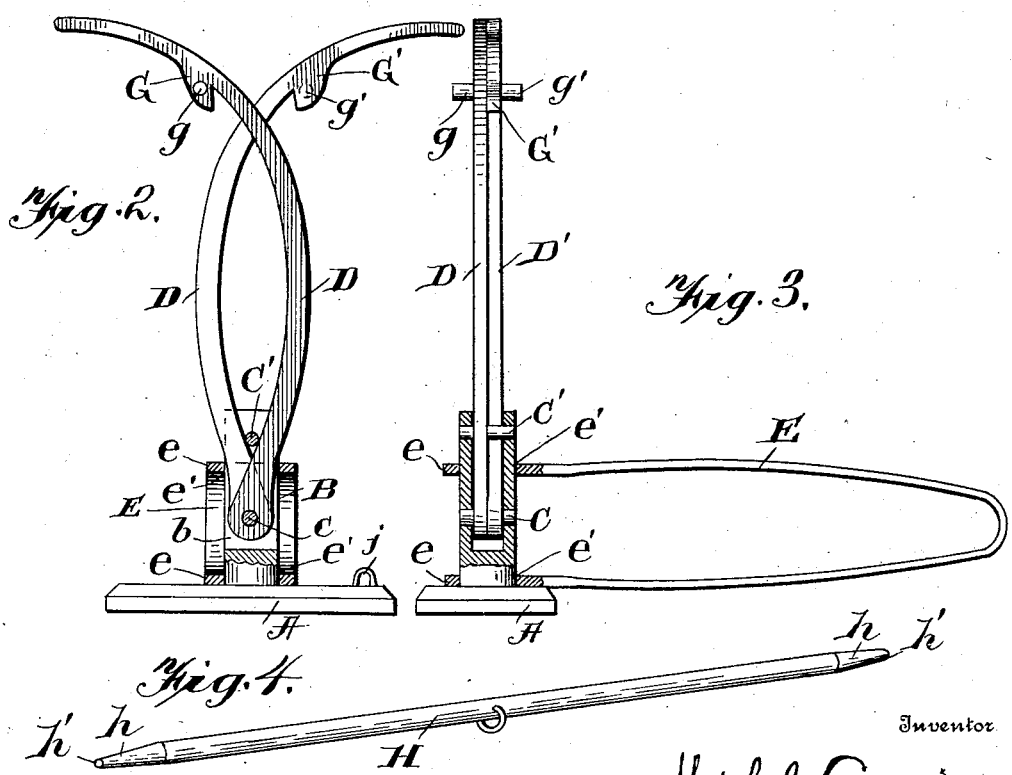
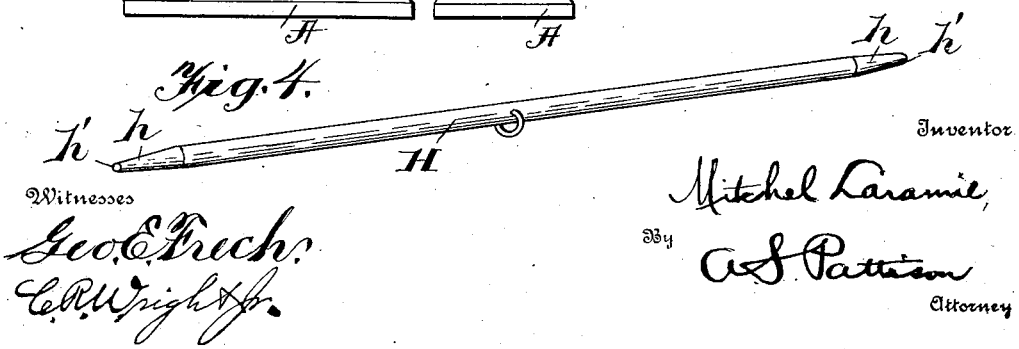
Witnesses
Geo. E. Frech.
C. R. Wright Jr.
Inventor
Mitchel Laramie,
By A. S. Patterson
Attorney

UNITED STATES PATENT OFFICE.

MITCHEL LARAMIE, OF WILLIMANTIC, CONNECTICUT.

ANIMAL-TRAP.

SPECIFICATION forming part of Letters Patent No. 698,973, dated April 29, 1902.

Application filed December 28, 1901. Serial No. 87,575. (No model.)

*To all whom it may concern:*

Be it known that I, MITCHEL LARAMIE, a citizen of the United States, residing at Willimantic, in the county of Windham and State of Connecticut, have invented new and useful Improvements in Animal-Traps, of which the following is a specification.

My invention relates to improvements in traps, and more particularly pertains to that class known as "jaw-traps."

The object of my invention is to provide a trap of the character described which is readily sprung by the animal coming in contact therewith from either side or from the top or bottom.

Another object of my invention is to provide a trap which catches the animal by the body and firmly holds it without injury to the fur.

A still further object of my invention is to provide a simple, cheap, and effective device which will not be affected by rust.

Referring now to the drawings, Figure 1 is a perspective view of my trap set. Fig. 2 is an end view of the trap sprung. Fig. 3 is a vertical sectional view taken on line 2 2 of Fig. 2. Fig. 4 is a perspective view of the trigger.

Referring now to the drawings, A represents a flat supporting-base of any desired contour and of a size sufficient to hold the trap in the desired vertical normal position. Centrally mounted in said base A is an upwardly-extending vertical stud B, having a vertical elongated slot $b$ therein. Arranged side by side within the said slot $b$ are two upwardly-extending curved arms D and D', and passing through the lower portion of said stud and through the said arms is a pin C, by means of which the arms are pivotally connected within the slot $b$ of the stud. The said stud B is provided with a second pin C', passing transverse the slot $b$ above the pin C and passing between the arms D and D', whereby the said arms engage the pin, thereby limiting the upward and outward movement of the arms when sprung and are prevented from passing each other and are so arranged that a space is left therebetween. For the purpose of springing the arms upward, as shown in Fig. 2, I employ a U-shaped leaf-spring E, having at its outer end the enlarged rounded portions $e$, having the openings $e'$, which are adapted to receive the stud B below the pivotal connection of the arms, and the lower member of said U-shaped spring resting or bearing against the base A and the upper member bearing against the pivoted arms D and D' and normally holding them in the position shown in Fig. 2. The pin C' also holds the arms D and D' the proper distance apart to prevent the upper portion of the U-shaped spring from moving too far in an upward direction. The arms D and D' are curved for the purpose of leaving an open space therebetween when the trap is sprung for the reception of the neck or body of the animal in order that the fur may not be injured. Near the outer ends of said arms D and D' are the enlarged portions G and G', which have riveted and extending from opposite sides thereof the rounded studs $g$ and $g'$. These studs are rounded for the purpose of having a smaller bearing-surface for the trigger, which I will now proceed to describe.

The trigger H consists of a round-metal bar having its ends tapered at $h$, so that there will be a small bearing-surface at the points $h'$, which rest on and are supported by the studs $g$ and $g'$ and by means of which the jaws or arms are held apart when the trap is set. The said trigger H has centrally connected thereto a chain I, which has the opposite end connected to an eye $j$, carried by the base A, for the purpose of preventing it from being lost or misplaced.

The operation of my device is as follows: The upper leaf of the spring is forced downward, and the arms or jaws are sprung apart and brought in nearly a horizontal position. The trigger H is then placed with one end against the rounded stud $g$, carried by the arm D, and the opposite end is brought diagonally across the arms and rests against the stud $g'$, extending in the opposite direction from the arm or jaw D'. It will be readily seen that by having the studs extending from opposite sides of the arms or jaws the trap is adapted to be sprung by the animal coming in contact with the trigger from either side, and by having the studs rounded and extending at right angles to the arms or jaws and the ends of the trigger being tapered the said trigger is adapted to be forced from the studs by either an upward or a downward pressure by the animal thereon.

From the above-described construction it will be readily seen that it is impossible for an animal to pass over or under the trap from either side without springing it.

Having thus described my invention, what I claim, and desire to secure by Letters Patent, is—

1. A trap of the character described, comprising a base normally upwardly spring-pressed arms, a trigger for holding said arms apart, and said arms having rounded trigger-surfaces, substantially as described.

2. A trap of the character described, comprising a base, normally upwardly spring-pressed arms, an outwardly-extending stud carried by the opposite side of each arm and a trigger resting between said studs, substantially as described.

3. A trap of the character described, comprising a base, normally upwardly spring-pressed arms, an outwardly-extending stud carried by the opposite side of each arm, and a trigger between said arms and having tapered ends engaging said studs, substantially as described.

4. A trap of the character described, comprising a base, normally upwardly spring-pressed arms, an outwardly-extending horizontal rounded stud carried by the opposite side of each arm, and a trigger resting between said studs, substantially as described.

5. A trap of the character described, comprising a base, arms pivoted thereto and normally upwardly spring-pressed, an outwardly-extending horizontal rounded stud carried by the opposite side of each arm, and a trigger having tapered ends resting on and supported between said studs, substantially as described.

6. A trap of the character described, comprising a base, a stud carried thereby and having a vertical slot therein, arms or jaws pivoted side by side in the lower end of said slot, a spring surrounding the stud, and normally forcing the arms upward, a pin transverse said slot between the arms to limit the movement thereof, a trigger for holding said arms apart, and means for supporting the trigger constructed to permit it to be tripped by a movement in any direction, substantially as described.

7. A trap of the character described, comprising a base, a stud carried thereby and having a vertical slot therein, arms or jaws pivoted side by side in the lower end of said slot, a spring surrounding the stud and normally forcing the arms upward, a pin transverse the slot between the arms, an outwardly-extending horizontal rounded stud carried by opposite sides of said arms, and a trigger having tapered ends resting and supported between said studs, substantially as described.

8. A trap of the character described, comprising a base, a stud carried thereby and having a vertical slot therein, jaws within said slot side by side, a pin passing transversely through said stud and arms, a V-shaped spring having its ends surrounding said stud, and one end normally forcing the arms upward, a pin transverse the slot between the arms, an outwardly-extending horizontal rounded stud carried by the opposite side of each arm, and a trigger having tapered ends resting and supported between said arms, substantially as described.

9. A trap of the character described, comprising a base, arms pivoted thereto and normally upwardly spring-pressed, a trigger between said arms, and said arms having horizontally-projecting trigger-surfaces, substantially as described.

In testimony whereof I have hereunto set hand in the presence of two subscribing witnesses.

MITCHEL LARAMIE.

Witnesses:
GEORGE GRIMES,
FRANK M. SMITH.